G. McD. JOHNS.
SPEED GOVERNOR FOR ELECTRIC MOTORS.
APPLICATION FILED MAY 21, 1918.

1,390,619.

Patented Sept. 13, 1921.

Inventor
George McD. Johns
By Ralph Rainth
Att'y.

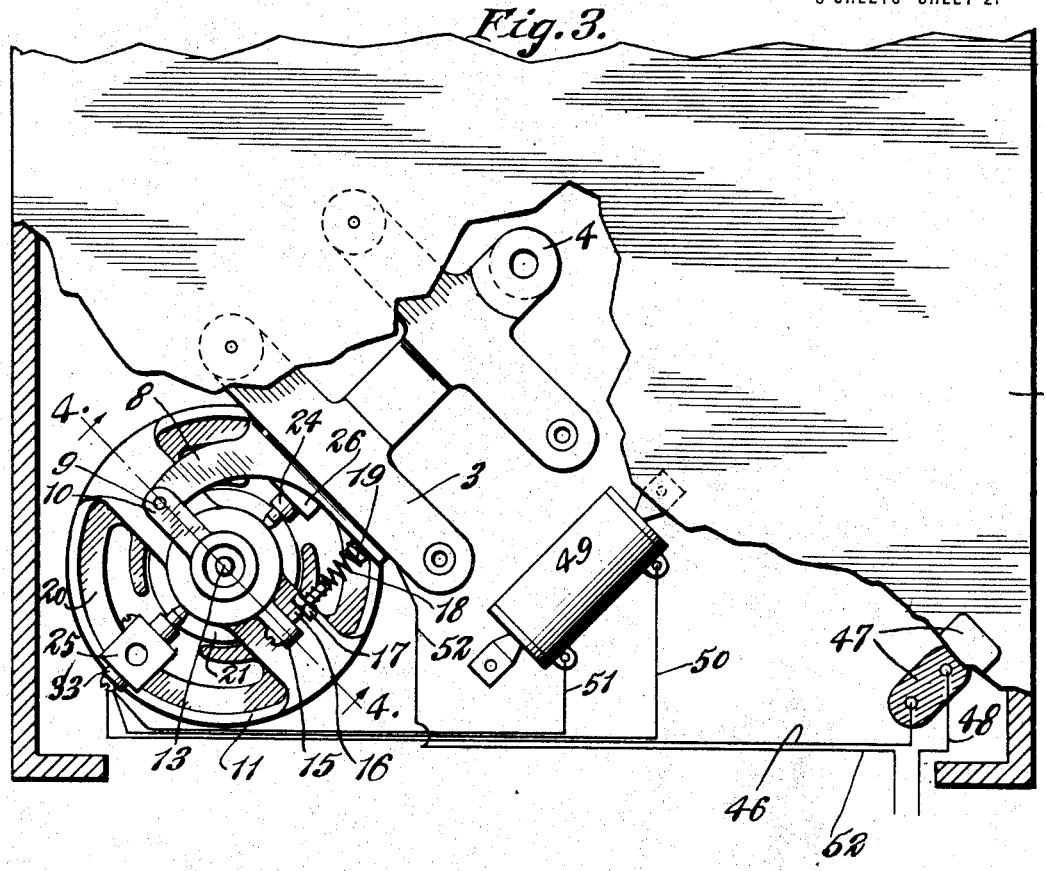
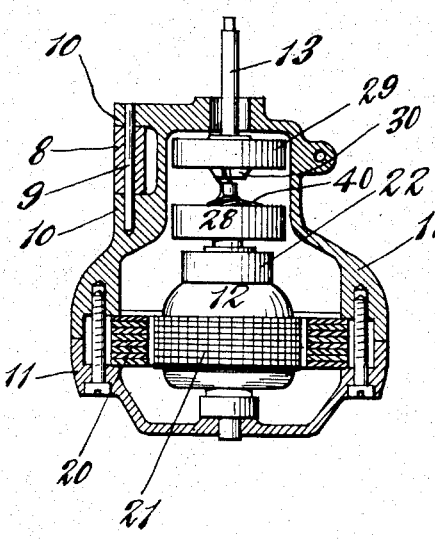
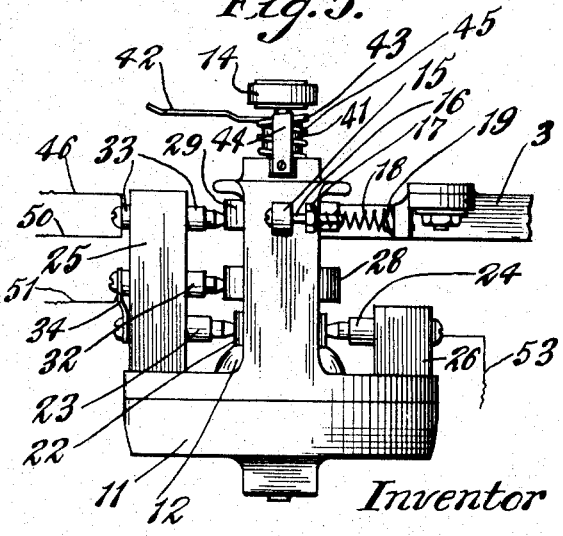

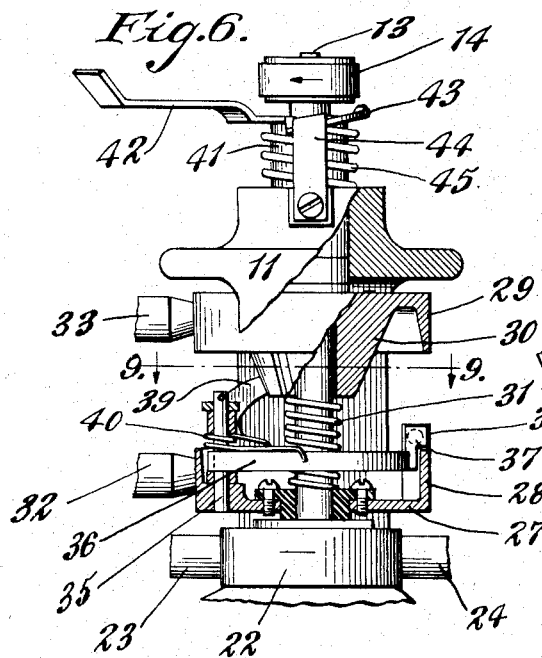
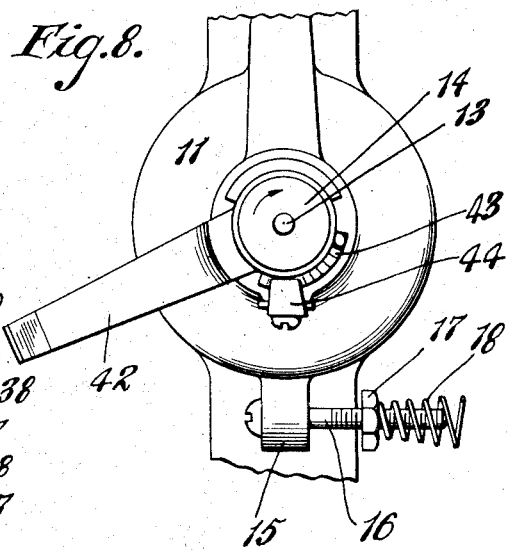
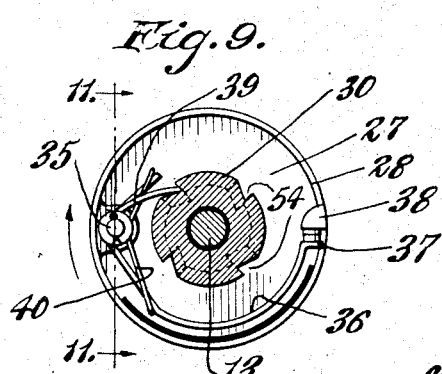
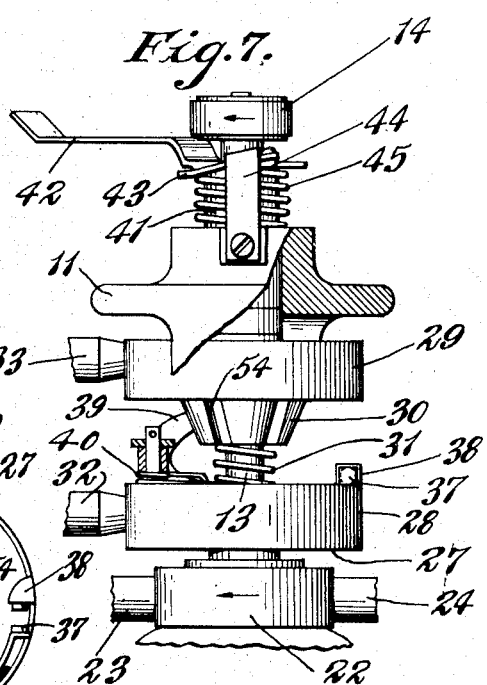
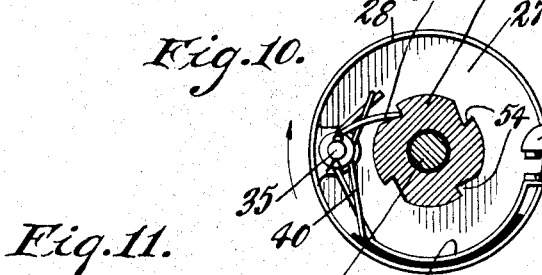
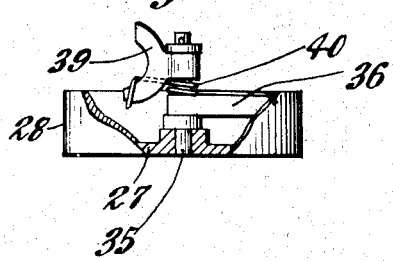

UNITED STATES PATENT OFFICE.

GEORGE McD. JOHNS, OF ST. LOUIS, MISSOURI, ASSIGNOR TO MACHINE PRODUCTS COMPANY, OF ST. LOUIS, MISSOURI, A CORPORATION OF MISSOURI.

SPEED-GOVERNOR FOR ELECTRIC MOTORS.

1,390,619.  Specification of Letters Patent.  Patented Sept. 13, 1921.

Application filed May 21, 1918. Serial No. 235,766.

*To all whom it may concern:*

Be it known that I, GEORGE McD. JOHNS, a citizen of the United States, residing at the city of St. Louis, State of Missouri, have invented certain new and useful Improvements in Speed-Governors for Electric Motors, of which the following is a specification, reference being had to the accompanying drawings, forming a part thereof.

This invention relates to certain new and useful improvements in speed governors for electric motors.

The principal object of my present invention is to provide an efficient and comparatively simple and inexpensive governor for controlling or regulating selectively the speed of the motor.

With the above and other objects in view, my invention resides in the provision of a motor speed governor adapted to form substantially a part of the motor circuit and which includes a yieldingly held element centrifugally actuable as the motor speeds up for breaking the normal motor circuit, and a resistance which is normally in shunt of the governor circuit, but which is cut into circuit with the motor on a breaking of the normal motor circuit; in the provision of a motor speed governor having a yieldingly held element centrifugally actuable as the motor speeds up for breaking the normal motor circuit, a resistance which is normally in shunt of the governor circuit, but which is cut into circuit with the motor on a breaking of the normal motor circuit, and means for retarding the centrifugal movement of said element for controlling or regulating selectively the speed of the motor; in the provision of a motor speed governor having parts or elements mounted upon and rotatable with the motor-shaft and which form or provide contact-members for normally completing the circuit through the motor; and in certain novel features of form, construction, arrangement, and combination of parts, all as hereinafter described and afterward pointed out in the claims.

For purposes of illustration and description and as showing an application of my invention, I have here arbitrarily chosen to show and describe my invention in connection with a motor-operated phonograph, the record-support or rotating table of the phonograph being the object driven by the motor; and in the accompanying drawings, Figure 1 is a fragmental plan view of a phonograph, showing the arrangement of the line-switch and the controlling-lever of the governor;

Fig. 3 is a plan of the motor and its suspension-means as applied to the phonograph, with portions of the phonograph-casing broken away and a part of the electric circuits traced;

Fig. 4 is a vertical sectional elevation through the motor and its frame and suspension-means, taken approximately on the line 4—4, Fig. 3.

Fig. 5 is an elevation of the motor and its frame and suspension-means, showing also part of the means for selectively controlling the motor speed;

Fig. 6 is an enlarged fragmental elevation, partly in section, of the motor and governor parts, showing the governor parts set to secure minimum spring tension upon the governor centrifugally actuable element;

Fig. 7 is a view approximately similar to Fig. 6, with the governor parts set to secure maximum spring tension upon the governor centrifugally actuable element;

Fig. 8 is an enlarged fragmental plan of the governor controlling lever and its cam;

Fig. 9 is a sectional plan, taken approximately on the line 9—9, Fig. 6, showing the centrifugally actuable element of the governor in normal circuit-closing position;

Fig. 10 is a view similar to Fig. 9, showing the centrifugally actuable element of the governor in actuated circuit-opening position; and Fig. 11 is a detail elevation, partly in section, taken approximately on the line 11—11, Fig. 9, showing the means for varying the tension or pull of the counter-spring upon the centrifugally actuable governor-element.

Figure 1:
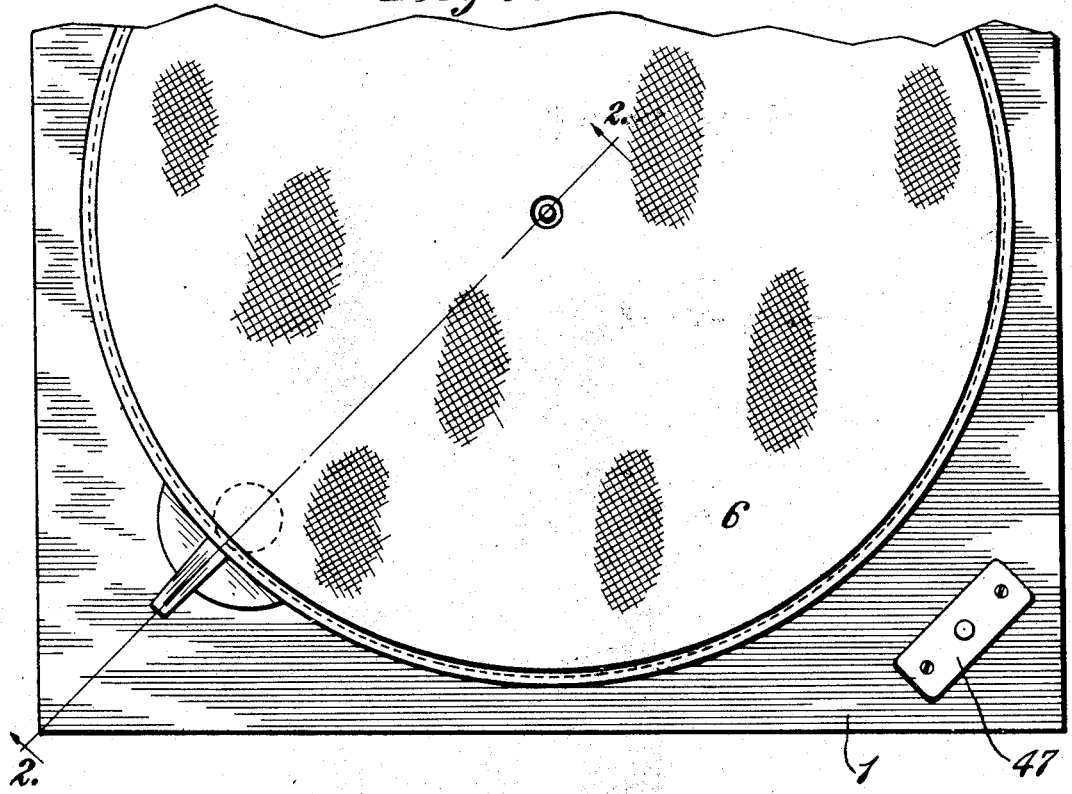

Referring in detail to the said drawings, in which like reference characters refer to like parts throughout the several views, 1 designates the casing of the phonograph. Fixed, as by bolts 2, to and within the casing 1, is a bracket 3 having a bearing 4 for a vertically disposed rotary stub-shaft 5. Mounted upon and rotatable with shaft 5, is the record-support or rotatable table 6 of the phonograph, table 6 being provided with a peripheral down-turned flange 7. Opposite the bearing 4, bracket 3 is provided with a curved arm 8 for swingably suspending the motor within the phonograph-casing 1, arm 8 fitting at its outer end between, and being pivotally connected, as by a pin 9, to, portions 10—10 of the motor-frame or cage 11.

Mounted for operation within frame or cage 11, is a motor 12, whose armature-shaft 13 is suitably elongated to extend upwardly through a suitable aperture 1ª in the phonograph-casing. Fixed upon the projecting end of the motor-shaft 13, is a friction-wheel 14 adapted to engage table-flange 7 for frictionally driving or rotating the disk-support or table 6.

On motor frame 11, diametrically opposite the motor-pivot 9, is a lug 15 provided with an internally threaded seat for a screw 16 on which is threaded a nut 17 serving as an adjustable abutment for an extensile coil-spring 18, whose other abutment 19 is carried by the bracket 3, spring 18 acting to yieldingly hold the motor-frame in outwardly swung position with its friction-wheel 14 in driving frictional engagement with the flange 7 of the disk-table 6. Such frictional engagement, as will be evident, may be increased or decreased, as may be required, by proper adjustment of nut 17 on its screw 16.

The motor 12 is of any standard or approved A. C. or D. C. preferably series type, having a field 20, armature 21, commutator 22, and commutator-brushes 23 and 24, which brushes are mounted preferably on insulation-posts 25 and 26, respectively, suitably fixed to the motor-frame.

Figure 2:
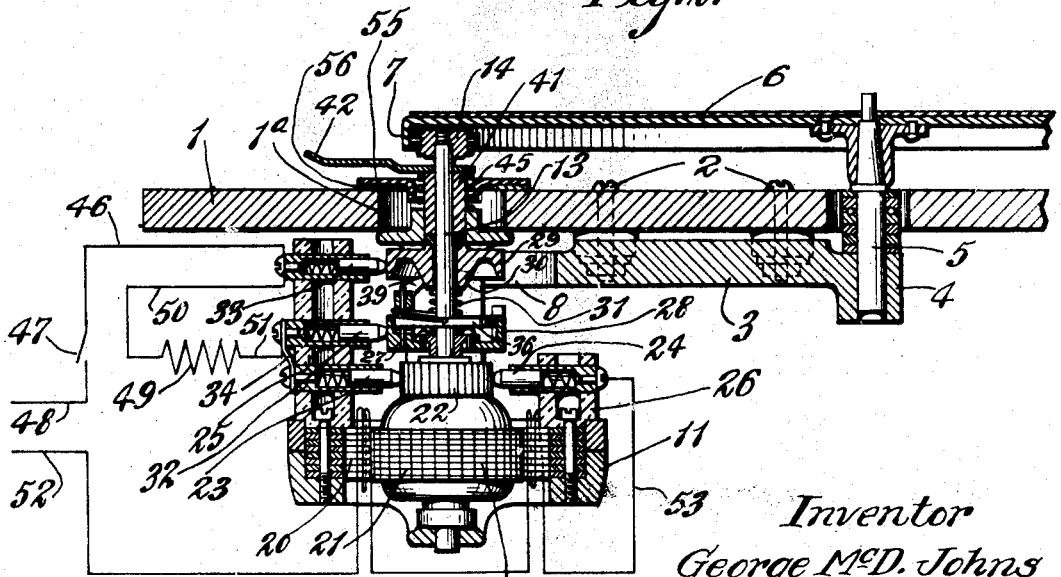
Fig. 2 is a fragmental vertical sectional elevation through the phonograph-casing and motor and governor parts, taken approximately on the line 2—2, Fig. 1, with the electric circuits traced.

Fixed upon, but insulated from, the shaft 13 next adjacent the commutator 22, is a disk or ring 27 having a peripheral upturned flange 28. Mounted preferably loosely upon, and insulated from, shaft 13 above ring or disk 27, is a peripherally flanged slip-ring 29 having a centrally disposed inverted cone-shaped portion 30, ring 29 being yieldingly held in spaced relation from disk 27 by an interposed spring 31 coiled upon shaft 13, as seen particularly in Figs. 2 and 6. Mounted on insulation-post 25 to electrically engage the flanges of disk 27 and ring 29, respectively, are brushes 32 and 33, brush 32 being electrically connected to commutator-brush 23 by means of a metallic link 34, as seen in Figs. 2 and 5.

As best seen in Figs. 2, 6, 9, and 10, disk 27 is provided with an upstanding pivot 35, on which is loosely mounted to swing within the confines of disk-flange 28 a curved centrifugally actuable governor-arm or switch 36 carrying at its free end a contact 37 adapted to electrically connect with a companion contact 38 fixed to the flange 28 of the disk. Coiled upon the pivot 35 with one end having engagement with the arm or switch 36 and its other end having engagement with the lower leg or a yoke 39 rotatably mounted on the pivot 35, as seen especially in Figs. 6 and 11, is a counter-spring 40 for yieldingly holding the governor-element 36 in so-called normal position with its contact 37 in electrical engagement with disk-contact 38, see Fig. 10, and also the other leg of the yoke 39 in engagement with the inverted cone-portion 30 of ring 29. Normally ring 29 is yieldingly held by the spring 31 in the position thereof illustrated in Fig. 6, with the upper leg of yoke 39 engaging the inverted cone 30 at or closely adjacent its lower end; and it may be here stated that cone 30, acting upon the yoke 39, is adapted to vary the tension or pull of the spring 40 upon the governor-element or arm 36 to correspondingly retard centrifugal movement of arm 36 to break the normal motor circuit.

Slidably disposed upon the shaft 13 is a block or sleeve 41 engaging at its lower end with, but insulated from, ring 29, and mounted pivotally upon shaft 13 to bear upon or engage with the upper end of block or sleeve 41, is a lever 42 having a helical cam 43 disposed under and engaging with a hook 44 fixed to, and upstanding from, the motor frame 11, as seen in Figs. 5, 6, and 7. Coiled on sleeve 41 and interposed between the upper portion of the motor-frame 11 and the under face of lever 42 and its cam 43, is a spring 45 for yieldingly holding cam 43 frictionally in engagement with hook 44 and consequently also the lever 42 in rotarily adjusted positions.

Upper brush 33 is electrically connected through a wire 46 and interposed main or circuit switch 47 with one of the line wires 48 leading to any suitable source of electrical energy or current supply. Electrically connecting said brush 33 with one terminal of a suitable resistance coil 49 mounted preferably upon and within the casing 1, is a connecting-wire 50, the other terminal of coil 49 being electrically connected through a wire 51 with lower disk-brush 32. The other line or service wire 52 leads to the motor windings, which are, in turn, in electrical connection with the commutator brush 24, as will be well understood.

Now, assuming the motor to be connected through the wires 48 and 52 with a suitable source of electrical energy, and it is desired to operate the phonograph or other driven object, main or line switch 47 is closed. At this time or normally, as I have described, the centrifugally actuable governor-arm or switch 36 is yieldingly held under the tension or pull of the spring 40 with its contact 37 in electrical connection with disk-contact 38. With the several parts in this or so-called normal relation, the circuit through the motor and governor parts is completed, following the line of least resistance, on the one side from service line 48 and main switch 47, through wire 46, brush 33, ring 29, yoke 39 and its pivot 35, governor-arm 36 and contacts 37 and 38 to disk 27 and its flange 28, and from flange 28 through brush 32, link 34, and brush 23 to the motor commutator, which, as before described, is electrically connected through opposite brush 24, wire 53, and the motor windings, with line wire 52 or the other side of the circuit.

With the full line electrical pressure on the motor and with the resistance shunted out, the motor tends to its highest speed of operation. Upon reaching some approximately predetermined speed—a speed at which the generated centrifugal force exerted on arm 36 is sufficient to overcome the tension or pull of the spring 40 upon such arm, the governor-arm 36 will be centrifugally thrown outwardly or into the position thereof illustrated in Fig. 10, breaking the circuit through the contacts 37 and 38. The resistance coil 49 being then, however, at once cut into the circuit, the circuit is then completed from brush 33, through wire 50, coil 49, wire 51, link 34, and brush 32 to and through the motor, as before described. The resistance 49 being so brought or introduced into the motor circuit the current or electrical pressure reaching the motor is reduced, with a consequent loss or reduction in the speed of the motor. A reduction in the speed of the motor and its shaft 13 will be accompanied by decreased centrifugal force or action upon the governor-arm 36, and should the speed of the motor decrease to a point where the generated centrifugal force exerted on the arm 36 is insufficient to maintain such arm in outwardly thrown position or in the position thereof illustrated in Fig. 10, arm 36 will swing or return to so-called normal position or into the position thereof illustrated in Fig. 9, resulting in again closing the circuit through the contacts 37 and 38, shunting the resistance 49 out of the circuit, and admitting an increased flow of current to maintain the necessary motor torque for the speed selected.

Should I desire to selectively change or control the speed of the motor, I move the lever 42 in one or the other direction, which accomplishes that result by a rotary movement of the helical cam 43 relatively to the fixed hook 44 and a consequent movement axially along the motor shaft and against the tension of spring 31 of the ring 29 carrying the cone 30. By the advance or retraction of this cone, the yoke 39 carried by the pivot 35 is made to operate against the pressure of the spring 40 while swinging about the pivot 35 as a center. The spring 40 is so connected with the governor-arm 36 that, upon a downward movement of the ring 29 and its cone 30, the tension or pull of the spring 40 upon the arm 36 is increased; hence, upon a swung movement of the yoke 39 from normal position, that is to say, from normal engagement with the lower end of the cone, the tension of the spring 40 upon the arm 36 is varied to counteract or retard the centrifugal tendency generated in the governor-arm by rotation of the shaft 13 and disk 27. Consequently, by the selective angular variation of the controller-lever 42, the sloping face of the cam 43 proportionately moves the controlling mechanism axially along the motor shaft, and by the variation in diameter of the cone 30 perpendicular to the motor-shaft, the yoke 39 is proportionately swung so as to correspondingly proportionately modify the tension or pull of the spring 40 upon the arm 36. This last action proportionately modifies the counteracting force to balance out or retard the centrifugal tendency in the governor-arm 36, the greater the pull or tension of the spring 40 upon the arm 36, the greater centrifugal force required to outwardly actuate the arm 36 to break the normal motor circuit through the contacts 37 and 38, the motor being hence permitted to run or operate at such higher speeds as may be desired for the work being done or object being driven. I am accordingly enabled to approximately definitely and accurately relate the speed of the motor to the angular position of the controller-lever 42.

To reduce wear upon the cone 30, the same is preferably ratcheted or grooved, as at 54, for engagement with the upper leg of the yoke 39, so that, instead of the yoke-leg moving upon the cone in the rotations of the disk or ring 27, ring 29 will be carried around with the disk 27 in its rotations.

The aperture 1ª in the phonograph-casing 1 is preferably neatly covered by a circular plate or disk 55 having a flanged aperture, as at 56, surrounding the spring 45, as seen especially in Fig. 2.

Thus, as described, I am enabled conveniently to selectively control or regulate the speed of the motor to the work being done, which is particularly desirable in connection with its present application to properly, as may be indicated, produce upon the phonograph the musical or other selection being played. And from actual commercial use, I may add that I have found my new governor most efficient in meeting all requirements. Other than the described selective manipulation of the lever 42, all manual manipulation, such as varying contact points relatively to the governor, is obviated, the governor substantially working automatically hand in hand with the motor at all times, and in the event of variation of electrical pressure or voltage in the outside source of current supply, the governor will automatically take from the line the proper amount of current to compensate approximately for voltage variation.

I am aware that changes in the form, construction, arrangement and combination of the several parts of the governor may be made and substituted for those herein shown and described without departing from the nature and principle of my invention.

Having thus described my invention, what I claim and desire to secure by Letters Patent is:

1. A motor-speed governor comprising, in combination, a first rotary ring, a contact-member carried by said ring, a switch-arm pivoted for movement on said ring, a second rotary ring shiftable axially relatively to the first ring and both rings being adapted for inclusion by stationary brushes in the motor-circuit, an inverted cone carried by the second ring, a yoke pivoted for movement on the first ring and electrically connecting the switch-arm and the second ring, the arm being adapted normally for contact with said member to complete the circuit through the rings and for centrifugal movement out of contact with said member to break the circuit through the rings as the motor speeds up, and a spring having engagement with the arm and with the yoke for yieldingly retarding centrifugal movement of the arm, a shifting of the second ring and its carried cone toward the first ring pivotally actuating the yoke and through the yoke increasingly varying the centrifugally-retarding pull of the spring upon the arm.

2. A motor-speed governor comprising, in combination, a first rotary ring, a contact-member carried by said ring, a switch-arm pivoted for movement on said ring, a second rotary ring yieldingly shiftable axially relatively to the first ring and both rings being adapted for inclusion by stationary brushes in the motor circuit, an inverted cone carried by the second ring, a yoke pivoted for movement on the first ring and electrically connecting the switch-arm and the second ring, the arm being adapted normally for contact with said member to complete the circuit through the rings and for centrifugal movement out of contact with said member to break the circuit through the rings as the motor speeds up, a spring having engagement with the arm and with the yoke for yieldingly retarding centrifugal movement of the arm, and means for shiftably actuating the second ring and its carried cone toward the first ring, a shifting of the second ring and its carried cone toward the first ring pivotally actuating the yoke and through the yoke increasingly varying the centrifugally-retarding pull of the spring upon the arm.

3. The combination with a motor and its circuit, of a first rotary ring, a second rotary ring, a pair of stationary brushes engaging electrically with the rings and both normally included in the motor circuit, a contact-member carried by the first ring, a yieldingly held switch arm pivoted for movement upon the first ring and having electrical engagement with the second ring, the arm being adapted normally for contact with said member to complete the motor circuit through both the brushes and the rings and for centrifugal movement out of contact with said member to break the circuit through the rings as the motor speeds up, and a resistance having electrical connection with the brush of the second ring and normally in shunt of a part of the circuit, the resistance being automatically thrown into the circuit, and the circuit being completed through the resistance, on a breaking of the circuit through the rings.

4. A motor-speed governor comprising, in combination, a rotary ring, a centrifugally actuable circuit-making-and-breaking element pivoted for movement on the ring, a spring having one end in engagement with the element for yieldingly retarding centrifugal movement of the element, and a yoke pivoted for movement upon the ring and having engagement with the other end of the spring, and means for actuating the yoke for increasingly varying the pull of the spring upon the element to retardingly control centrifugal movement thereof.

5. A motor-speed governor comprising, in combination, a rotary ring, a centrifugally actuable circuit-making-and-breaking element pivoted for movement on the ring, a yoke also pivoted for movement on the ring, a spring having engagement with one leg of the yoke and with the element for yieldingly retarding centrifugal movement of the element, and means including a shiftable conoidal member having engagement with the other leg of the yoke for increasingly varying the tension of the spring upon the element to retardingly control centrifugal movement thereof.

6. A motor-speed governor comprising, in combination, a rotary ring centrifugally actuable circuit-making-and-breaking element pivoted for movement on the ring, a yoke also pivoted for movement on the ring, a spring having engagement with one leg of the yoke and with the element for yieldingly retarding centrifugal movement of the element, means including a shiftable conoidal member having engagement with the other leg of the yoke for pivotally actuating the yoke for increasingly varying the tension of the spring upon the element to retardingly control centrifugal movement thereof, and a lever for shiftingly actuating the conoidal member.

In testimony whereof, I have signed my name to this specification.

GEORGE McD. JOHNS.